(12) United States Patent
Kato et al.

(10) Patent No.: US 8,779,670 B2
(45) Date of Patent: Jul. 15, 2014

(54) LIGHTING DEVICE, LIGHTING CONTROL DEVICE AND LIGHTING SYSTEM

(71) Applicant: Panasonic Corporation, Osaka (JP)

(72) Inventors: Junichi Kato, Osaka (JP); Takashi Kanda, Osaka (JP); Koji Saeki, Osaka (JP); Tomoaki Mannami, Osaka (JP); Yuichirou Hirowatari, Osaka (JP); Shinichiro Kurihara, Osaka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 13/653,542

(22) Filed: Oct. 17, 2012

(65) Prior Publication Data

US 2013/0099678 A1 Apr. 25, 2013

(30) Foreign Application Priority Data

Oct. 24, 2011 (JP) ................................. 2011-232813

(51) Int. Cl.
*H05B 37/02* (2006.01)

(52) U.S. Cl.
USPC ............ 315/159; 315/149; 315/359; 307/117

(58) Field of Classification Search
USPC ................... 315/149–159, 359; 307/116–117
See application file for complete search history.

(56) References Cited

U.S. PATENT DOCUMENTS

| | | | | |
|---|---|---|---|---|
| 5,699,243 | A | * 12/1997 | Eckel et al. | 700/17 |
| 6,522,078 | B1 | * 2/2003 | Okamoto et al. | 315/149 |
| 2010/0052576 | A1 | * 3/2010 | Steiner et al. | 315/361 |
| 2011/0012433 | A1 | * 1/2011 | Parsons | 307/117 |
| 2011/0074225 | A1 | * 3/2011 | Delnoij et al. | 307/117 |
| 2012/0091901 | A1 | * 4/2012 | Tanigawa et al. | 315/158 |

FOREIGN PATENT DOCUMENTS

JP 11-037840 A 2/1999

* cited by examiner

*Primary Examiner* — Jason M Crawford
(74) *Attorney, Agent, or Firm* — Renner, Otto, Boisselle & Sklar, LLP

(57) ABSTRACT

A lighting device includes a pyroelectric sensor, a shutter and a lighting control unit. The lighting control unit is configured, when the lighting load is turned off, to turn the lighting load on if the pyroelectric sensor detects a change in infrared radiation. The lighting control unit is also configured, when the lighting load is turned on, to turn the lighting load off if a repetition count or time of a lighting retention time reaches a specified count or time, respectively, with no change in infrared radiation detected through the pyroelectric sensor within each lighting retention time per the passage of lighting retention time.

6 Claims, 4 Drawing Sheets

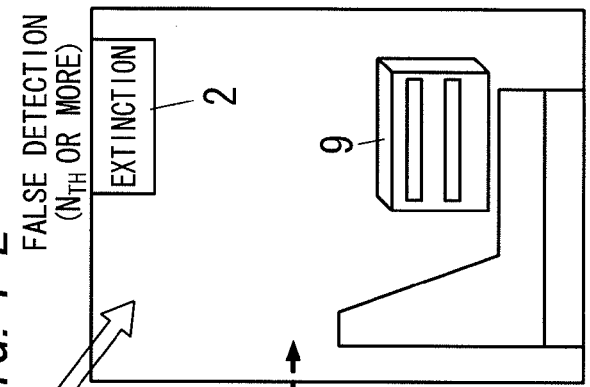
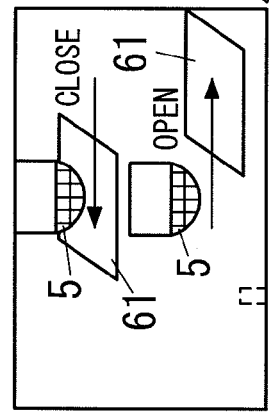
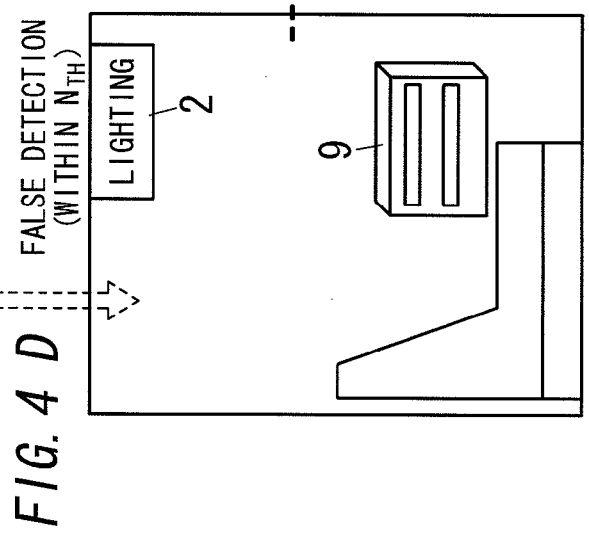
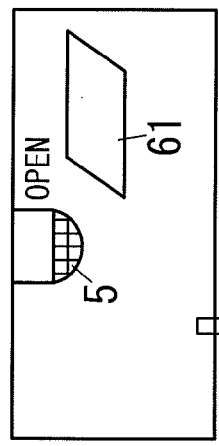
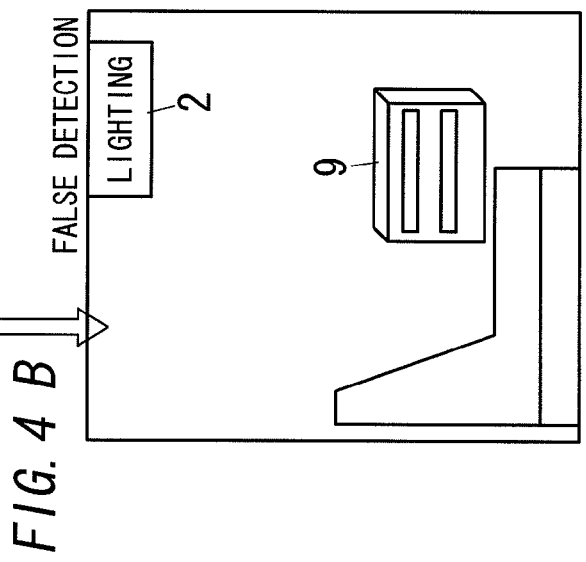

LIGHTING DEVICE, LIGHTING CONTROL DEVICE AND LIGHTING SYSTEM

TECHNICAL FIELD

The invention relates to a lighting device, a lighting control device and a lighting system.

BACKGROUND ART

There are existing different systems capable of turning a lighting load on if a pyroelectric sensor detects a human body.

Such systems however have an issue that a lighting load is turned off if a human does not move, because such a pyroelectric sensor cannot detect a human in an immobile state.

The issue can be solved by a human body detecting device disclosed in Japanese Patent Application Publication Number 11-37840 (hereinafter referred to as a "document 1"). The human body detecting device is provided with a shutter which is located between a human and a pyroelectric element and is configured to start closing and opening after human movement is detected. According to the device of the document 1, it is possible to detect a change in infrared radiation from a human body by closing and opening the shutter even though the human does not move. Therefore, the device disclosed in the document 1 can avoid a lighting load being turned off, because it can detect the presence of a human even if the human does not move.

However, the device of the document 1 cannot distinctively detect a simple heat source (object) and a human body. Accordingly even if a heat source other than a human body is present in a sensor range of the pyroelectric element, the On state of the lighting load is maintained. For example, if a human moves in the sensor range to turn on a heat source such as a TV set, a desk lamp or the like and then moves out of the sensor range, the heat source remains in the sensor range. Accordingly, if the heat source is not removed, the pyroelectric element continues detecting the heat source to keep the lighting load turned on.

SUMMARY OF INVENTION

It is an object of the present invention to control a lighting load while distinguishing a fixed heat source from a human body.

A lighting device (3) of the present invention comprises a pyroelectric sensor (5), a shutter (61), a lighting control unit (76) and a shutter control unit (73). The pyroelectric sensor (5) is configured to detect a change in infrared radiation. The shutter (61) is configured to keep the infrared radiation out of the pyroelectric sensor (5). The lighting control unit (76) is configured to control a lighting load (2). The shutter control unit (73) is configured, when the lighting load (2) is turned on, to control the shutter (61) per the passage of first time period so that the shutter (61) closes and then opens for a second time period shorter than the first time period. The lighting control unit (76) is configured: (a), when the lighting load (2) is turned off, to turn the lighting load (2) on if the pyroelectric sensor (5) detects a change in infrared radiation; and (b), when the lighting load (2) is turned on, to turn the lighting load (2) off if a repetition count or time of the first time period reaches a specified count or time, respectively, with no change in infrared radiation detected through the pyroelectric sensor (5) within each first time period per the passage of first time period.

In an embodiment, the lighting control unit (76) is further configured (c), when the lighting load (2) is turned on, to initialized the repetition count or time if the pyroelectric sensor (5) detect a change in infrared radiation within a current first time period.

In an embodiment, the lighting control unit (76) is further configured (d), when the lighting load (2) is turned on, to turn the lighting load (2) off if the pyroelectric sensor (5) detects no change in infrared radiation before and after closing and then opening of the shutter (61).

In an embodiment, the first time period is a predetermined lighting retention time for keeping the lighting load (2) turned on.

A lighting control device (7) of the present invention comprises the lighting control unit (76) and the shutter control unit (73) in the lighting device (3).

A lighting system (1) of the present invention comprises the lighting device (3) and the lighting load (2).

According to the present invention, it is possible to distinguish a fixed heat source from a human body, and accordingly even if a heat source is only a fixed heat source, the lighting load can be turned off and power consumption of the lighting load can be reduced.

BRIEF DESCRIPTION OF DRAWINGS

Preferred embodiments of the invention will now be described in further details. Other features and advantages of the present invention will become better understood with regard to the following detailed description and accompanying drawings where:

FIGS. 4A, 4B, 4C, 4D and 4E illustrate a usage example of the lighting system in a case where a heat source is a fixed heat source.

DESCRIPTION OF EMBODIMENTS

Figure 1:
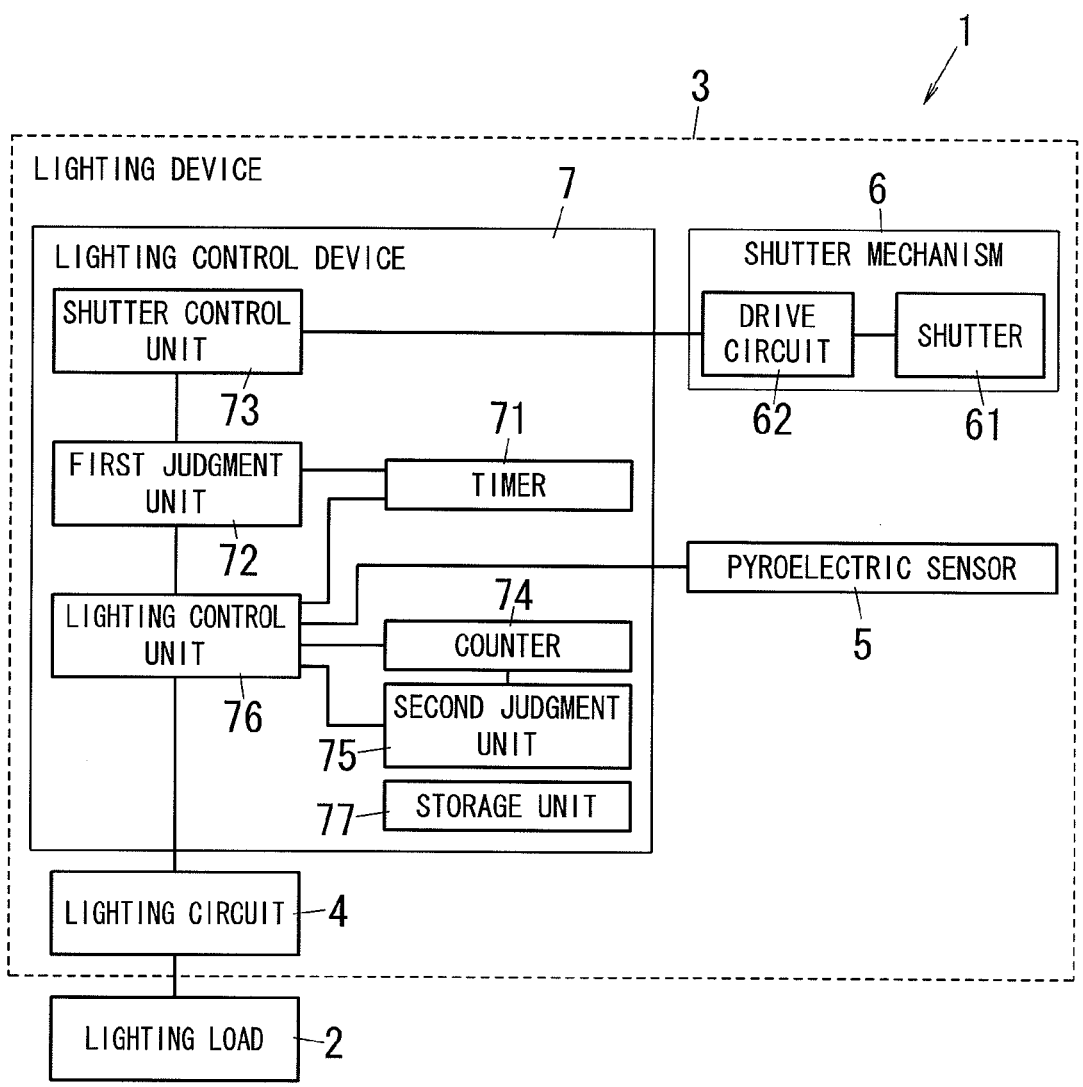
FIG. 1 is a block diagram of a lighting system in accordance with an embodiment of the present invention.

FIG. 1 shows a lighting system 1 in accordance with an embodiment of the present invention. The lighting system 1 includes a lighting load 2, and a lighting device 3 configured to control the lighting load 2.

The lighting device 3 includes: a lighting circuit 4 configured to turn the lighting load 2 on and off; a pyroelectric sensor 5 which has a sensor range and is configured to detect a change in infrared radiation (IR); a shutter mechanism 6 including a shutter 61 located in front of a heat receiving surface (an incidence plane) sensitive to IR of the pyroelectric sensor 5; and a lighting control device 7 configured to supply a control signal to the lighting circuit 4 to control the lighting load 2. In the embodiment, the lighting circuit 4 is further configured to dim the lighting load 2.

The lighting circuit 4 is configured to turn the lighting load 2 on or off, or dim the lighting load 2 in accordance with a control signal from the lighting control device 7.

The control signal is formed of, for example, a PWM (Pulse Width Modulation) signal, and is all-inclusive term of a turn-on signal for turning the lighting load 2 on, a turn-off signal for turning the lighting load 2 off, and a dimming signal for dimming the lighting load 2 at prescribed brightness (a dimming ratio).

The pyroelectric sensor 5 has the incidence plane for receiving infrared radiation emitted from a heat source such as a human body or the like, and is configured to detect a change in infrared radiation received through the incidence plane, thereby detecting the presence of the heat source in the sensor range.

The shutter mechanism 6 includes the shutter 61 which is openable and located in front of the incidence plane of the pyroelectric sensor 5, and a drive circuit 62 configured to open and close the shutter 61. The shutter 61 is located in front of the incidence plane of the pyroelectric sensor 5 so that the shutter 61 prevents infrared radiation from entering the incidence plane of the pyroelectric sensor 5. The shutter 61 is also configured to be moved through the drive circuit 62, thereby closing or opening the incidence plane. The drive circuit 62 is configured to close and open the shutter 61 in accordance with a drive signal from the lighting control device 7, thereby closing and opening the incidence plane of the pyroelectric sensor 5, respectively.

In an example of the shutter 61 used in the present embodiment, an opening (e.g., a window, a cut or the like) through which infrared radiation passes to enter the incidence plane of the pyroelectric sensor 5 is formed at a part of the shutter 61, and the shutter 61 is configured to be movable in parallel along the incidence plane. In this example, the shutter 61 is reciprocated in parallel along the incidence plane for a short time (a second time period), thereby closing and then opening the incidence plane of the pyroelectric sensor 5 for a short time. In an example of the shutter 61, the shutter 61 is configured to be pivotable between closing and opening positions for closing and opening the incidence plane of the pyroelectric sensor 5. In this example, the shutter 61 is pivoted and reciprocated for a short time (the second time period), thereby closing and then opening the incidence plane of the pyroelectric sensor 5 for a short time. In an example of the shutter 61, the shutter 61 is a disk-like shutter having an opening through which infrared radiation passes to enter the incidence plane of the pyroelectric sensor 5 is formed at a part of the shutter 61. In this example, the shutter 61 is configured to be rotated a short time (the second time period), thereby closing and then opening the incidence plane of the pyroelectric sensor 5 for a short time.

The lighting control device 7 is mainly formed of a microcomputer embedded with a CPU (Central Processing Unit) and a memory, and includes a timer 71, a first judgment unit 72, a shutter control unit 73, a counter 74, a second judgment unit 75, a lighting control unit configured to control the lighting load 2 (specifically, perform lighting control of the lighting load 2), and a storage unit 77.

The timer 71 is configured to periodically count a predetermined lighting retention time (a first time period) for keeping the lighting load 2 turned on (specifically, maintaining an illumination state (including a dimming state) of the lighting load 2). For example, the timer 71 is configured to periodically start or restart counting from one second to the lighting retention time (seconds) whenever the pyroelectric sensor 5 detects a change in infrared radiation. That is, the second time period is shorter than the first time period (the lighting retention time).

The first judgment unit 72 is configured to judge whether or not the timer 71 finishes counting the lighting retention time.

The shutter control unit 73 is configured to supply a drive signal to the drive circuit 62 to close or open the shutter 61. For example, if the timer 71 finishes counting the lighting retention time, the shutter control unit 73 supplies a drive signal to the drive circuit 62 to close and then open the shutter 61 for a short time.

The counter 74 is configured to obtain a repetition count of the lighting retention time. That is, the counter 74 is configured to count the number of times the lighting retention time elapsed repeatedly with no change in infrared radiation detected through the pyroelectric sensor 5 within each lighting retention time per the passage of lighting retention time. Specifically, if the current lighting retention time elapses with no change in infrared radiation detected through the pyroelectric sensor 5 within the current lighting retention time, the counter 74 adds a predetermined value (e.g., one) to the repetition count (value). If a change in infrared radiation is detected through the pyroelectric sensor 5 within the current lighting retention time, the counter 74 initializes the repetition count. For example, the counter 74 sets the repetition count to zero.

The second judgment unit 75 is configured to judge whether or not the repetition count (value) is (reaches) a specified count (value).

The lighting control unit 76 is configured to supply a control signal to the lighting circuit 4 to turn the lighting load 2 on or off, or to dim the lighting load 2 based on the detection information of the pyroelectric sensor 5 and the like. For example, if the pyroelectric sensor 5 detects a change in infrared radiation, the lighting control unit 76 supplies the lighting circuit 4 with a turn-on or dimming signal as a control signal for turning the lighting load 2 on. However, in this case, if the lighting load 2 has been already turned on, the lighting control unit 76 may be configured to be prohibited from supplying a turn-off signal to the lighting circuit 4. On the other hands, if the pyroelectric sensor 5 detects no change in infrared radiation after closing and then opening of the shutter 61 for a short time, the lighting control unit 76 supplies the lighting circuit 4 with a turn-off signal as a control signal for turning the lighting load 2 off. In addition, if the second judgment unit 75 judges that the repetition count (value) reaches the specified count (value), the lighting control unit 76 supplies the lighting circuit 4 with a turn-off signal.

The storage unit 77 stores therein different data (data sets). The storage unit 77 also stores therein a program for different functions which the lighting control device 7 carries out. That is, the storage unit 77 stores therein a program for making the lighting control device (computer) 7 function as the timer 71, the first judgment unit 72, the shutter control unit 73, the counter 74, the second judgment unit 75 and the lighting control unit 76.

The lighting control device 7 sets a lighting retention time to itself (specifically, the timer 71) if the pyroelectric sensor 5 detects a change in infrared radiation after closing and then opening of the shutter 61 for a moment. The lighting control device 7 judges that a human movement is detected if the pyroelectric sensor 5 detects a change in infrared radiation before the (current) lighting retention time elapses. The lighting control device 7 then sets (resets) a lighting retention time to itself and maintains the current illumination state of the lighting load 2.

It's conceivable that a motionless time ($T_{MT}$) of a human is in a range from about 20 minutes to about one hour, wherein the motionless time ($T_{MT}$) is a time in which a human can maintain a motionless condition (a static condition) in a normal life style.

In addition, if a heat source including a human body is removed from the sensor range of the pyroelectric sensor 5, it is preferable that the lighting load 2 should be turned off as soon as possible. Accordingly, in the embodiment, the lighting retention time ($T_{LRT}$) is set to be in a range from about ten seconds to about one minute in consideration of closing and opening frequency of the shutter 61. The specified count (value) is calculated based on the motionless time ($T_{MT}$) and the lighting retention time ($T_{LRT}$) (e.g., an integer value of $T_{MT}/T_{LRT}$).

Figure 2:
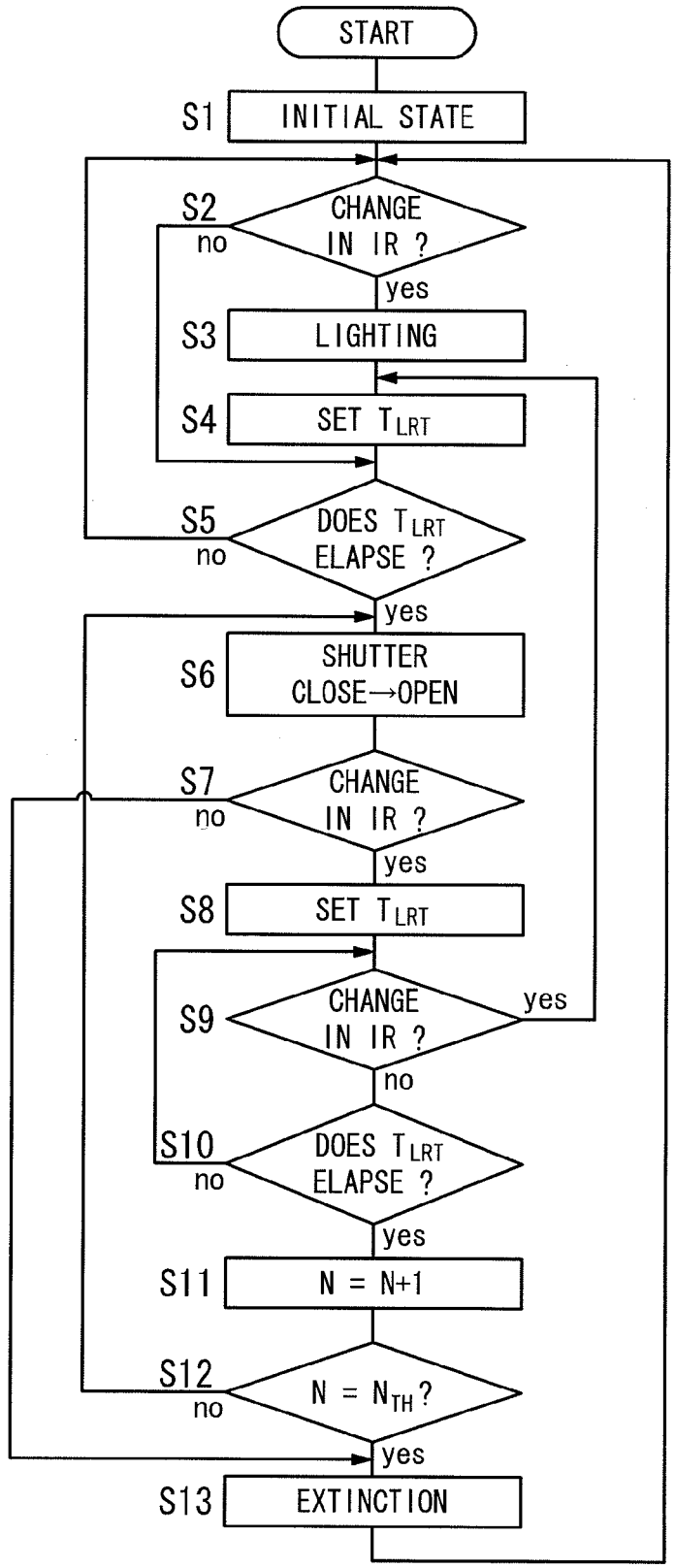
FIG. 2 is a flowchart for showing an operation of the lighting system.

An operation of the lighting system 1 in the embodiment is explained with reference to FIG. 2. In an initial state, the lighting load 2 is turned off and also the shutter 61 is opened (S1).

The pyroelectric sensor 5 is in an operating state for detecting a change in infrared radiation (S2). If the pyroelectric sensor 5 detects a change in infrared radiation, the lighting control device 7 turns the lighting load 2 on (S3), and then sets a lighting retention time ($T_{LRT}$) to start counting the lighting retention time (S4). At this time, lighting control device 7 also initializes the repetition count (value). For example, the repetition count is set to zero. The lighting control device 7 then judges whether or not the lighting retention time ($T_{LRT}$) has elapsed (S5). If the lighting retention time elapses, the shutter 61 is closed and then opened for a moment (S6). The lighting control device 7 turns the lighting load 2 off (S13), if the pyroelectric sensor 5 does not detect any change in infrared radiation before and after closing and then opening of the shutter 61 (S7).

On the other hand, if the pyroelectric sensor 5 detects a change in infrared radiation (S7) before and after closing and then opening of the shutter 61 (S6), the lighting control device 7 sets (resets) a lighting retention time to start counting the lighting retention time (S8), and also keeps the lighting load 2 turned on.

If the lighting retention time ($T_{LRT}$) elapses with no change in infrared radiation detected within the lighting retention time (S9 and S10), the lighting control device 7 adds one to the repetition count value (N) (S11). That is, (N+1) is obtained as a new repetition count value (N). The lighting control device 7 judges whether or not the repetition count value (N) is the specified count value ($N_{TH}$) (S12). If the repetition count value (N) is not the specified count value ($N_{TH}$), step S6 is returned to. If the repetition count value (N) reaches the specified count value ($N_{TH}$), the lighting control device 7 decides that a fixed heat source other than a human is detected, and then turns the lighting load 2 off (S13). At step S9, if the pyroelectric sensor 5 detects a change in infrared radiation within the lighting retention time, step S4 is returned to. At this time, the lighting control device 7 initializes the repetition count (value).

A usage example of the lighting system 1 in the embodiment is explained with reference to FIGS. 3A-3E and 4A-4E. In FIGS. 3B and 3D, a heat source is a human body 8. In FIGS. 4B, 4D and 4E, a heat source is a fixed heat source 9 such as, for example, an electric heater fixed and arranged in a sensor range of the pyroelectric sensor 5.

Figure 3A:
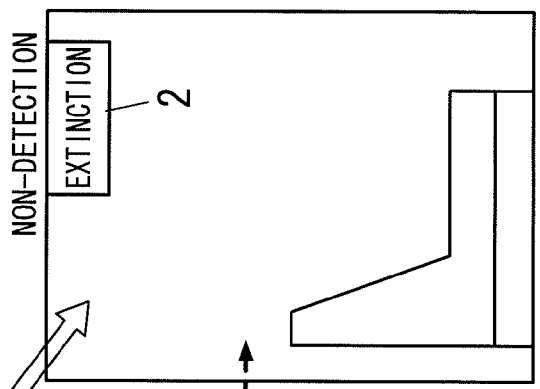
FIGS. 3A, 3B, 3C, 3D and 3E illustrate a usage example of the lighting system in a case where a heat source is a human body.
Figure 3C:
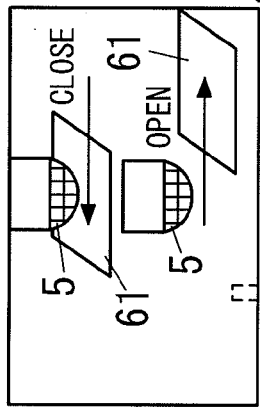
Figure 3B:
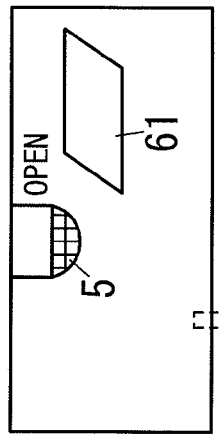
Figure 3D:
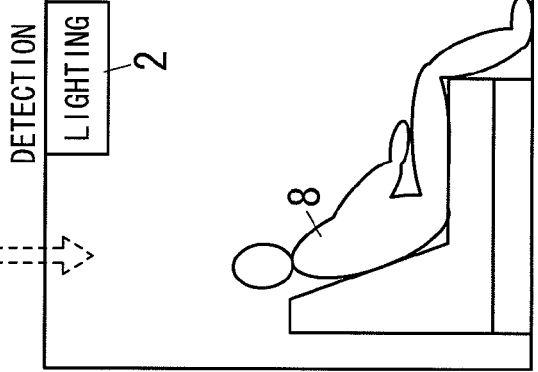
Figure 3E:
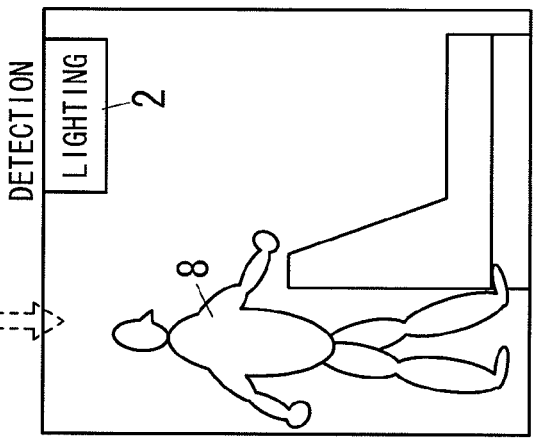

As shown in FIG. 3A, the shutter 61 in front of the pyroelectric sensor 5 is opened usually. If the pyroelectric sensor 5 detects a change in infrared radiation, the lighting control device 7 turns the lighting load 2 on to start counting a lighting retention time (FIG. 3B). If a human body 8 remains stationary or is non-present in a sensor range of the pyroelectric sensor 5, a change in infrared radiation is not detected. Accordingly, the lighting retention time elapses, and the shutter 61 in front of the pyroelectric sensor 5 is closed once and then opened (FIG. 3C).

If a human body 8 is present in the sensor range of the pyroelectric sensor 5 at the moment the shutter 61 is opened (FIG. 3D), the pyroelectric sensor 5 detects a change in infrared radiation before and after closing and then opening of the shutter 61. If the pyroelectric sensor 5 detects the change in infrared radiation, the lighting control device 7 keeps the lighting load 2 turned on, and also sets a lighting retention time again to start counting the lighting retention time.

On the other hand, if a human body 8 is non-present in the sensor range of the pyroelectric sensor 5 at the moment the shutter 61 is opened (FIG. 3E), the pyroelectric sensor 5 detects no change in infrared radiation before and after closing and then opening of the shutter 61. Accordingly, the lighting control device 7 turns the lighting load 2 off.

As shown in FIG. 4A, when a fixed heat source 9 other than a human body 8 is present in a sensor range of the pyroelectric sensor 5, the shutter 61 in front of the pyroelectric sensor 5 is closed once and then opened if a lighting retention time elapses (FIG. 4C).

If the fixed heat source 9 is present in the sensor range of the pyroelectric sensor 5 at the moment the shutter 61 is opened (FIG. 4D), the pyroelectric sensor 5 detects a change in infrared radiation before and after closing and then opening of the shutter 61. If the pyroelectric sensor 5 detects the change in infrared radiation, the lighting control device 7 keeps the lighting load 2 turned on, and also sets a lighting retention time again to start counting the lighting retention time.

The aforementioned operation is repeated a specified count value ($N_{TH}$). In the meantime, if no lighting retention time is renewed, the lighting control device 7 judges that not a human body 8 but a fixed heat source 9 is present in a sensor range of the pyroelectric sensor 5, and then turns the lighting load 2 off.

Incidentally, if the fixed heat source 9 is non-present in the sensor range of the pyroelectric sensor 5 at the moment the shutter 61 is opened, the pyroelectric sensor 5 detects no change in infrared radiation before and after closing and then opening of the shutter 61, and accordingly the lighting control device 7 turns the lighting load 2 off.

According to the lighting system 1 in the embodiment, it is possible to judge that a heat source in the sensor range of the pyroelectric sensor 5 is a fixed heat source if the repetition count of the lighting retention time is the specified count or more with no change in infrared radiation detected through the pyroelectric sensor 5 within each lighting retention time per the passage of lighting retention time. That is, it is possible to distinguish a fixed heat source 9 from a human body 8. As a result, the lighting load 2 can be turned off only when a heat source is a fixed heat source, and power consumption of the lighting load 2 can be reduced.

In the lighting system 1 in the embodiment, even if a fixed heat source 9 is present in the sensor range, the closing and opening operation of the shutter 61 can be stopped, and the number of times the shutter 61 is closed and then opened can be reduced considerably. As a result, it is possible to reduce electric power for driving a motor adapted to open and close the shutter 61.

In an embodiment, the lighting control device 7 is configured to turn the lighting load 2 off if a repetition time of the lighting retention time reaches a specified time with no change in infrared radiation detected through the pyroelectric sensor 5 within each lighting retention time per the passage of lighting retention time. That is, the repetition time is a time the lighting retention time elapsed repeatedly with no change in infrared radiation detected through the pyroelectric sensor 5 within each lighting retention time per the passage of lighting retention time. In this case, the repetition time corresponds to a lighting time from the turn-on of the lighting load 2. In this embodiment, the second judgment unit 75 judges whether or not the repetition time measured with the timer 71 or the like is a specified time (S12). The repetition time is initialized at step S4. That is, if a change in infrared radiation is detected through the pyroelectric sensor 5 within the current lighting retention time, the lighting control device 7 initializes the repetition time. For example, the lighting control device 7 sets the repetition time to zero. According to this configuration, it is possible to distinguish a fixed heat source 9 from a human body 8, and accordingly the number of times the shutter 61 is closed and then opened can be reduced considerably.

Although the present invention has been described with reference to certain preferred embodiments, numerous modifications and variations can be made by those skilled in the art without departing from the true spirit and scope of this invention, namely claims.

The invention claimed is:

1. A lighting device, comprising:
   a pyroelectric sensor configured to detect a change in infrared radiation;
   a shutter configured to keep the infrared radiation out of the pyroelectric sensor;
   a lighting control unit configured to control a lighting load; and
   a shutter control unit configured, when the lighting load is turned on, to control the shutter per the passage of first time period so that the shutter closes and then opens for a second time period shorter than the first time period,
   wherein the lighting control unit is configured:
   (a), when the lighting load is turned off, to turn the lighting load on if the pyroelectric sensor detects a change in infrared radiation; and
   (b), when the lighting load is turned on, to turn the lighting load off if a repetition count or time of the first time period reaches a specified count or time, respectively, with no change in infrared radiation detected through the pyroelectric sensor within each first time period per the passage of first time period.

2. The lighting device of claim 1, wherein the lighting control unit is further configured
   (c), when the lighting load is turned on, to initialize the repetition count or time if the pyroelectric sensor detect a change in infrared radiation within a current first time period.

3. The lighting device of claim 2, wherein the lighting control unit is further configured
   (d), when the lighting load is turned on, to turn the lighting load off if the pyroelectric sensor detects no change in infrared radiation before and after closing and then opening of the shutter.

4. The lighting device of claim 1, wherein the first time period is a predetermined lighting retention time for keeping the lighting load turned on.

5. A lighting control device, comprising the lighting control unit and the shutter control unit in the lighting device of claim 1.

6. A lighting system, comprising the lighting device of claim 1 and the lighting load.

* * * * *